H. W. HITCHCOCK.
ELECTRICAL MEASURING APPARATUS.
APPLICATION FILED OCT. 18, 1920.

1,419,674.

Patented June 13, 1922.

INVENTOR
Harry W. Hitchcock
BY
ATTORNEY

UNITED STATES PATENT OFFICE.

HARRY W. HITCHCOCK, OF NEW YORK, N. Y., ASSIGNOR TO AMERICAN TELEPHONE AND TELEGRAPH COMPANY, A CORPORATION OF NEW YORK.

ELECTRICAL MEASURING APPARATUS.

1,419,674.        Specification of Letters Patent.    Patented June 13, 1922.

Application filed October 18, 1920. Serial No. 417,764.

*To all whom it may concern:*

Be it known that I, HARRY W. HITCHCOCK, residing at New York, in the county of New York, borough of Bronx, and State of New York, have invented certain Improvements in Electrical Measuring Apparatus, of which the following is a specification.

This invention relates to an electrical measuring apparatus, and especially to means for determining the impedance of an electric circuit at various frequencies.

In the co-pending application of Hitchcock, Serial No. 417,763, filed October 18, 1920, there has been described a method and means for determining the impedance of an electric circuit in which the potential of a two-phase generator has been applied to the real line and to the artificial balancing line by means of an inductive device known as a phase shifter. This invention is a modification of the arrangement shown in the aforesaid co-pending application in that it provides an arrangement for applying the current from one of the phases of a two-phase generator directly to the circuit to be measured without the interposition of an inductive arrangement such as the phase shifter referred to.

Figure 1:
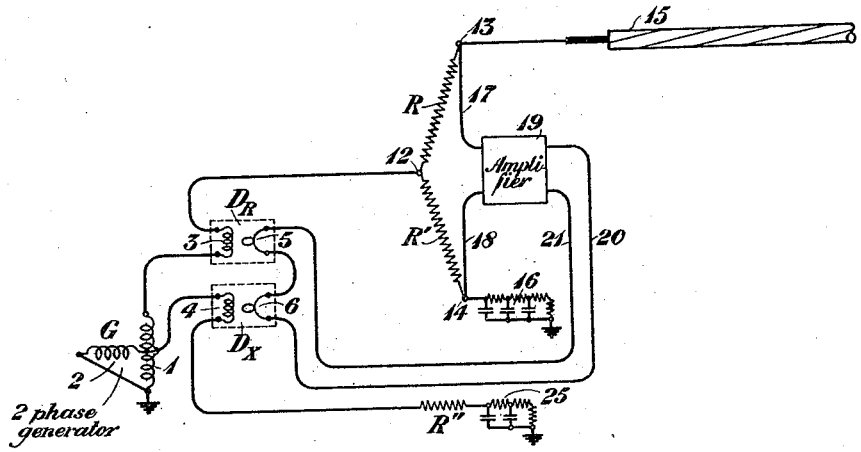
Figure 2:
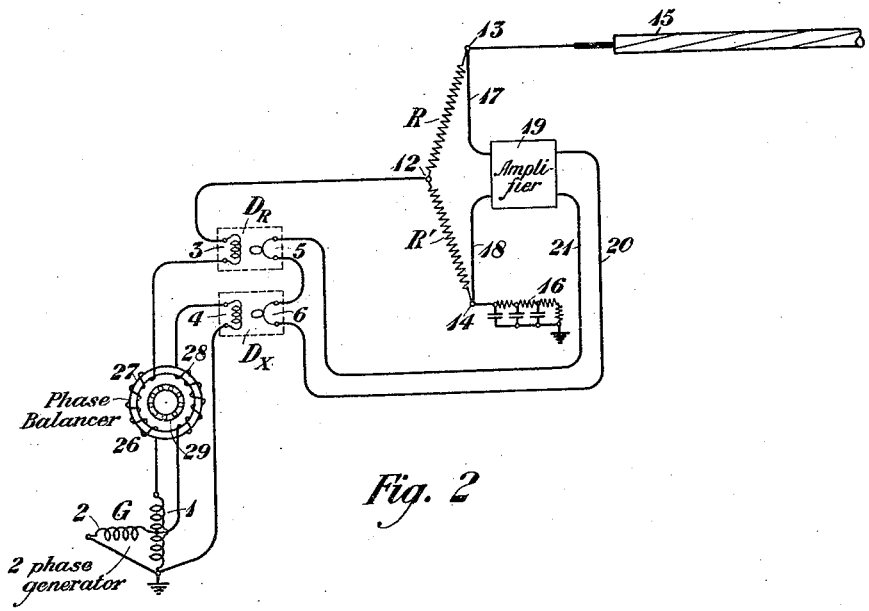

This invention will be made clearer from the following description when read in connection with the attached drawing, of which Figures 1 and 2 show two forms of embodiment of the invention.

In the arrangement shown in Fig. 1, a submarine cable 15 is connected with the ratio arm R at the point 13, and an artificial line 16 is connected with the ratio arm R' at the point 14. The two ratio arms R and R' which are equal in magnitude are connected together at the point 12. Bridged across the points 13 and 14 and connected therewith by means of the conductors 17 and 18 respectively is a distortionless amplifier 19, preferably of the thermionic type, the output side of which is connected by means of conductors 20 and 21 with the movable coils 5 and 6 of the dynamometers $D_R$ and $D_X$. G represents a two-phase sine wave generator comprising the windings 1 and 2. One terminal of winding 1 is grounded and the other terminal is connected with the field coil 3 of the dynamometer $D_R$ which is also connected with the midpoint 12 of the ratio arms. One terminal of the other winding 2 of the said generator is grounded and the other terminal is connected with one terminal of the field coil 4 of the dynamometer $D_X$, the other terminal of which is connected to ground through a resistance R'' in series with an artificial line 25. Since the combination of the resistance R'' and the artificial line 25 is designed to balance the combination of the resistance R and the line 15 in parallel with the resistance R' and the artificial line 16, the value of resistance R'' is equal in magnitude to one-half of either R or R', and likewise the value of the artificial line 25 is equal in magnitude to one-half of either the line 15 or the artificial line 16.

In Fig. 2, the same designating symbols have been used to indicate parts which are the same in Figs. 1 and 2. The arrangement shown in Fig. 2 differs from that shown in Fig. 1 by the use of a phase balancer 26 instead of the combination of the resistance R'' and the artificial line 25 shown in Fig. 1 to equalize currents flowing through the field coils 3 and 4. The phase balancer 26 comprises two windings, 27 and 28, the former of which is connected in series with winding 1 of the generator G and the latter is connected in series with the winding 2 of the said generator. Located within the core on which these windings are placed is a rotor, preferably of the squirrel-cage type, which is adapted to rotate therein. In accordance with the principles well known to those skilled in the art, the action of this phase balancer tends to equalize substantially the currents in the two phases and to maintain the desired phase relation.

In order to obtain the best results, it is important that the resistance component should be great relative to the inductive reactance. Since the resistance of the circuit includes that of the ratio arms it is obvious that the magnitude of the resistance component may be increased by making the value of the ratio arms great.

Having in mind the foregoing description of the various parts that comprise the arrangement shown in Figs. 1 and 2, and their relation to each other, the invention will be fully understood from the following description of its mode of operation.

Considering Fig. 1, let it be assumed that the generator G is applying a potential between the midpoint 12 of the ratio arms and ground, and also across the resistance R'' and the artificial line 25 to ground. The currents resulting from the application of the potentials of the two phases will cause a flow of current through the field coils 3 and 4 respectively of the dynamometer $D_R$ and $D_X$. Since the line 15 and the artificial line 16 are identical except for magnitudes of the second order, the current in the field coil 3 will be at all times equal to twice the current in the line 15 and will be exactly in phase with it. Since the dynamometer $D_X$ is connected to the other phase of the generator in series with the artificial impedance comprising the resistance $R''$ and the artificial line 25, which are equal in value to the impedance of the line, and the artificial line is measured between the apex 12 of the ratio arms and ground, the current in the field coil 4 will then be at all times equal to the current in the field coil 3 of $D_R$, but 90 degrees displaced from it in phase. If the impedance of the line 15 is exactly equal to that of the artificial line 16, there will be no difference of potential across the points 13 and 14, and consequently, no current will flow through the movable coils 5 and 6 of the dynamometers, and accordingly there will be no deflection of the said coils. The input circuit of the amplifier should be of exceedingly high resistance, so as to minimize the current flow between these two points. Furthermore the current supplied to the line may be held constant by means of a generator field regulator placed in series with the input circuit of the amplifier.

Let it be assumed that there is a small resistance unbalance between the line 15 and the artificial line 16. This will cause a difference of potential across the points 13 and 14 which will cause a flow of current through the input circuit of the amplifier. The amplifier current in the output side of the circuit will flow through the movable coils 5 and 6 which are serially connected. Since the unbalance is produced by a resistance, the current in the line will be in phase with the said difference of potential. The current in the line flows through the field coil 3 and the currents resulting from the difference of potential across the points 13 and 14 flow through the coils 5 and 6. Since the currents in the coils 3 and 5 are in phase, they will be displaced by an amount proportional to the magnitude of the resistance unbalance. Since the currents in the coils 4 and 6 are displaced 90 degrees in phase, no deflection will be produced by the dynamometer $D_X$. Thus, the nature of the unbalance and its magnitude are known.

In a similar manner, a reactance unbalance between the line 15 and its artificial line 16 will produce a difference of potential across the input side of the amplifier 19 and the resultant current flowing through the movable coils 5 and 6 will be 90 degrees displaced in phase from the current flowing through the coil 3, but will be in phase with that flowing through the coil 4. Consequently, no deflection will be produced by the dynamometer $D_R$ but a deflection proportional to the magnitude of the reactance unbalance will be produced by the dynamometer $D_X$. And in like manner, the impedance unbalance comprising both resistance and reactance components will produce deflections in both of the dynamometers $D_R$ and $D_X$ the magnitudes of which will be proportional to the resistance and the reactance components of the unbalance.

The mode of operation shown in Fig. 2 is in general the same as that shown in Fig. 1. In this arrangement, the phase balancer 26 takes the place of the impedance $R''$ plus the artificial line 25 shown in Fig. 1. Any tendency of the currents through the windings 27 and 28 to vary would be counteracted by the operation of this device, and thereby the currents in the windings 3 and 4 are maintained equal in magnitude and displaced in phase by 90 degrees. Such an arrangement for maintaining the currents of the two phases equal is best adapted for frequencies up to approximately 50 or 60 cycles. Consequently, for measurements at higher frequencies, the arrangement shown in Fig. 1 is preferable.

In order to clearly show the invention, there have been purposely omitted therefrom certain details which are well known to those skilled in the art. Thus, to increase the efficiency of the arrangement, a voltage regulating device should be connected with the generator in order to ensure constancy of voltage. Furthermore, some form of current regulating device should be connected with the circuit of the dynamometer field coils in order to ensure constancy of the current flowing therethrough.

It will be seen from the foregoing that this invention provides means for the direct measurement of the resistance and the reactance components of the impedance not only of a circuit, such as is shown, but also of all types of circuits and apparatus.

Although this invention has been disclosed in certain particular forms of embodiment, it is apparent that it is capable of embodiment in other and different forms without departing from the spirit and scope of the appended claims.

What is claimed is:

1. In an electrical measuring device, the combination with an impedance of a second impedance adjusted to approximately balance electrically said first impedance, a source of two-phase potential having one phase winding connected with said impedances in parallel, and the second phase winding connected with a current-balancing arrangement, and means connected with said impedances and said source of potential to indicate the nature and magnitude of the unbalance existing between said impedances.

2. In an electrical measuring device, the combination with a line of an artificial line adjusted to approximately balance electrically the said line, a source of two-phase potential having one phase connected with the said line and the said artificial line in parallel and the second phase connected with means to equalize the current in both phases, and means connected with the said line and the said artificial line and with the said source of potential to indicate the unbalance between the said line and the said artificial line.

3. In an electrical measuring device, the combination with a line of an artificial line adjusted to approximately balance electrically the said line, ratio arms connecting said line and said artificial line in parallel, a plurality of electrical indicating instruments, a two-phase source of potential having one phase connected through the field winding of one instrument to the ratio arms, and the other phase connected through the field winding of the other instrument to a device for equalizing the currents in both phases and means bridged across the said ratio arms to impress upon the movable coils of said instruments any difference of potential existing across said ratio arms.

4. In an electrical measuring device, the combination with a line of an artificial line adjusted to approximately balance electrically the said line and correlated by means of ratio arms, a second artificial line designed to approximate electrically the said line and the said first artificial line in parallel, a two-phase generator having one phase connected with the said ratio arms and the other phase with the said second artificial line and indicating means connected with the said source and the said ratio arms adapted to show the magnitude and the nature of the unbalance between the said line and the said artificial line.

In testimony whereof, I have signed my name to this specification this 15th day of October 1920.

HARRY W. HITCHCOCK.